(12) United States Patent
Sood et al.

(10) Patent No.: US 8,935,382 B2
(45) Date of Patent: Jan. 13, 2015

(54) FLEXIBLE LOGGING, SUCH AS FOR A WEB SERVER

(75) Inventors: Vishal Sood, Bothell, WA (US); Jack E. Freelander, Monroe, WA (US); Brian E. Blum, Woodinville, WA (US); Geqiang (Sam) Zhang, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 608 days.

(21) Appl. No.: 12/405,217

(22) Filed: Mar. 16, 2009

(65) Prior Publication Data

US 2010/0235494 A1    Sep. 16, 2010

(51) Int. Cl.
G06F 15/173    (2006.01)
H04L 29/08    (2006.01)
H04L 12/24    (2006.01)

(52) U.S. Cl.
CPC ............ *H04L 67/22* (2013.01); *H04L 41/06* (2013.01)
USPC ........................................................ 709/224

(58) Field of Classification Search
USPC ................................................ 709/223, 224
See application file for complete search history.

(56) References Cited

U.S. PATENT DOCUMENTS

| | | | |
|---|---|---|---|
| 6,173,418 B1 * | 1/2001 | Fujino et al. | .................... 714/20 |
| 6,243,105 B1 | 6/2001 | Hoyer et al. | |
| 6,317,787 B1 | 11/2001 | Boyd et al. | |
| 7,058,704 B1 | 6/2006 | Mangipudi et al. | |
| 7,181,445 B2 | 2/2007 | Bebo et al. | |
| 2002/0152284 A1 | 10/2002 | Cambray et al. | |
| 2003/0033400 A1 * | 2/2003 | Pawar et al. | .................... 709/223 |
| 2003/0208549 A1 | 11/2003 | El-Shimi | |
| 2004/0039809 A1 * | 2/2004 | Ranous et al. | .................... 709/223 |
| 2005/0049924 A1 | 3/2005 | DeBettencourt et al. | |
| 2005/0268237 A1 * | 12/2005 | Crane et al. | .................... 715/732 |
| 2007/0050846 A1 | 3/2007 | Xie et al. | |
| 2007/0136798 A1 | 6/2007 | Fitzgerald et al. | |
| 2008/0021984 A1 | 1/2008 | Zarenin et al. | |

FOREIGN PATENT DOCUMENTS

| | | |
|---|---|---|
| CN | 1452066 | 10/2003 |
| CN | 1925423 | 3/2007 |

OTHER PUBLICATIONS e-Security. "Partner Sales Guide". Winter 2002.*

(Continued)

*Primary Examiner* — Scott Christensen
(74) *Attorney, Agent, or Firm* — Ben Tabor; David Andrews; Micky Minhas (57) ABSTRACT

A flexible logging system is described herein that operates with a web server to provide activity logging in a way that is customizable to include a variety of data fields, can capture both client and server log information to a single location, and can provide data to an analysis engine directly to provide near real-time reporting. The system captures events within the web server as they occur and can provide reporting before the final response occurs. During request processing in the web server, server extension modules raise log events whenever an event occurs. The system matches the received data to a log definition and writes the data to any log that matches. Thus, the flexible logging system provides a rich, flexible, and fast platform for content providers and administrators to get a real-time view of the state of requests to their web servers.

20 Claims, 4 Drawing Sheets

(56) References Cited

OTHER PUBLICATIONS

"IIS Tracer Web Site Monitoring Tool", retrieved at <<http://iismonitor.motobit.com/>>, Mar. 10, 2009, pp. 1-3.

Gerhards, et al., "Remotely Monitoring IIS Log Files", retrieved at <<http://www.monitorware.com/Common/en/SecurityReference/Monitoring-IIS-Logs.pdfz>>, Mar. 7, 2003, pp. 1-12.

IISFAQ, "Your best resource to help install, Configure & Troubleshoot IIS", retrieved at <<http://www.iisfaq.com/default.aspx?View=A550&P=134>>, Mar. 10, 2009, pp. 1-2.

"IIS Monitoring and Logging", retrieved at <<http://ist.uwaterloo.ca/~dkeenan/docs/iis/log.html>>, Mar. 10, 2009, pp. 1-6.

Cluts, Nancy Winnick., "msdn", "Using WCAT to Stress-Test IIS", retrieved at <<http://msdn.microsoft.com/en-us/library/ms951774.aspx#usingwcat_topic1>>, Dec. 14, 1998, pp. 1-10.

"Logging to Databases", retrieved at <<http://docs.rinet.ru/MIIS/ch18.htm>>, Mar. 10, 2009, pp. 1-6.

"Internet Information Services", "Log Files for a Site <logFile>", retrieved at <<http://www.iis.net/ConfigReference/system.applicationHost/sites/site/logFile>>, Mar. 10, 2009, pp. 1-6.

"International Search Report", Mailed Date: Sep. 30, 2010, Application No. PCT/US2010/026709, Filed Date: Mar. 9, 2010, pp. 9.

Chinese Office Action in Chinese Patent Application No. 201080012721.4, dated Aug. 27, 2013, 14 pages.

Second Office Action in Chinese Patent Application No. 201080012721.4, dated May 8, 2014.

Chinese Office Action in counterpart Chinese Patent Application No. 201080012721.4, dated Nov. 14, 2014, 15 pages.

\* cited by examiner

FLEXIBLE LOGGING, SUCH AS FOR A WEB SERVER

BACKGROUND

Web servers typically produce logs of activity that provide a record of the requests received and the responses sent by the web server. The W3C maintains a standard format for web server log files (see, e.g., "http://www.w3.org/TR/WD-log-file"), but other proprietary formats exist. The majority of analysis tools support the standard log file format but the information about each server transaction is fixed. The server typically appends more recent entries to the end of the log file, and the server may periodically start a new log file (e.g., when the current log reaches a certain size or a period passes). The server typically adds information about the request, including client IP address, request date/time, page requested, HTTP response code, bytes served, user agent, and referrer. The server can combine these fields into a single file, or separate them into distinct logs, such as an access log, error log, or referrer log. These files are usually not accessible to general Internet users, only to the webmaster or other administrator. Following is an example of a typical web server log.

Version: 1.0
Date: 12-Jan-1996 00:00:00
Fields: time cs-method cs-uri
00:34:23 GET /foo/bar.html
12:21:16 GET /foo/bar.html
12:45:52 GET /foo/bar.html
12:57:34 GET /foo/bar.html Webmasters may use statistical analysis of web server logs to examine traffic patterns by time of day, day of week, referrer, or user agent. Analysis of the web server logs can aide efficient web site administration, adequate hosting resources, and the fine-tuning of sales efforts. Web analytics is the measurement, collection, analysis, and reporting of internet data for purposes of understanding and optimizing web site usage. On-site web analytics measure a visitor's journey once on a web site. This includes drivers and conversions; for example, which landing pages encourage people to make a purchase, as well as performance of the web site in a commercial context. This data is typically compared against organization performance indicators, and used to improve a web site or marketing campaign's audience response.

Many different vendors provide on-site web analytics software and services. There are two main technological approaches to collecting the data. The first method, log file analysis, reads the log files in which the web server records all its transactions. The second method, page tagging, uses JavaScript on each page to notify a third-party server when a web browser renders a page. Both collect data that can be processed to produce web traffic reports.

Web log analysis software (also called a web log analyzer) is a simple kind of web analytics software that parses a log file from a web server, and based on the values contained in the log file, derives indicators about who, when, and how a web server is visited. Usually reports are generated from the log files immediately, but the log files can alternatively be parsed to a database and reports generated on demand. In the early 1990s, web site statistics consisted primarily of counting the number of client requests (or hits) made to the web server. This was a reasonable method initially, since each web site often consisted of a single HTML file. However, with the introduction of images in HTML and web sites that spanned multiple HTML files this count became less useful.

The extensive use of web caches also presented a problem for log file analysis. If a person revisits a page, the second request will often be retrieved from the browser's cache, and so the web server will receive no request. This means that the person's path through the site is lost. Caching can be defeated by configuring the web server, but this can result in degraded performance for the visitor to the website. Web analytics vendors combated this by adding client side logic that caused the client to report usage information to a log server, prompting more log analysis.

Web log analysis still exhibits a number of undesirable problems. First, there are delays inherent in the process of logging. There is a delay from the time a request is received to the time it is written to the log (e.g., because of delayed disk cache flushing by the operating system or hardware), delays in getting the logs to the place where they will be analyzed, and delays in processing the logs and providing the data in a format suitable for analysis, such as via rows in a database. Each of these delays mean that a content provider cannot find out up to the minute information about the providers site is being used. For some types of content, such as live media events, this can mean no meaningful analysis of the event's success until the event is over. Some decisions, such as load balancing, may improve with more immediate information about site usage, which is typically obtained in other ways (such as by monitoring performance counters) that provide only course-level data (e.g., without visitor or request information).

In many cases, it is useful to record more information than is supported by the standard log format. Sites sensitive to personal data issues may wish to omit the recording of certain data. Thus, a second problem is that the web site log files may not actually contain the data most relevant to the content provider, and the web server may not support providing any more than a handful of predefined fields of data. For other types of information, the content provider may have to write custom extensions for the web server or simply be unable to obtain the data. Sometimes the content provider can obtain the additional data at the client, but then log analysis software performs an extra step of attempting to correlate client and server logs to provide a complete picture of what happened for a single client. This data correlation also adds delays to web traffic analysis.

SUMMARY

A flexible logging system is described herein that operates with a web server to provide activity logging in a way that is customizable to include a variety of data fields, can capture both client and server log information to a single location, and can provide data to an analysis engine directly to provide near real-time reporting. The flexible logging system captures requests and other events within the web server as they occur and can provide reporting before the final response occurs. The system receives a log definition from a web administrator or other user that defines fields of data that the administrator wants to log and one or more destinations to which to store the fields. The system may receive multiple log definitions for different purposes, so that some logs contain different data and are stored in different destinations. During request processing in the web server, server extension modules raise log events whenever an event occurs for which the server has data that an administrator may want to log. The system matches the received data to the log definition and writes the data to any log that matches. The log destination may include a database in addition to traditional log files, so that reporting software accessing the database can perform real-time reporting. Thus, the flexible logging system provides a rich, flexible, and fast platform for content providers and administrators to get a real-time view of the state of requests to their web servers.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

A flexible logging system is described herein that operates with a web server to provide activity logging in a way that is customizable to include a variety of data fields, can capture both client and server log information to a single location, and can provide data to an analysis engine directly to provide near real-time reporting. The system is also extensible, so that third-party developers can add new data to be logged. Developers can also extend the system by writing custom processing applications that receive the same data that is bound for logs. A custom application might write the data directly to a database or a dashboard application. In typical web logs, a web server makes a log entry when a request concludes. For requests for large media files (e.g., an hour-long streaming presentation), this may mean no log information is even written for a long time, much less available for analysis. The flexible logging system captures requests and other events within the web server as they occur and can provide reporting before the final response occurs. The system receives a log definition from a web administrator or other user that defines fields of data that the administrator wants to log and one or more destinations to which to store the fields. The system may receive multiple log definitions for different purposes, so that some logs contain different data and are stored in different destinations. During request processing in the web server, server extension modules raise log events whenever an event occurs for which the server has data that an administrator may want to log. The system matches the received data to the log definition and writes the data to any log that matches. The log destination may include a database in addition to traditional log files, so that reporting software accessing the database can perform real-time reporting. Thus, the flexible logging system provides a rich, flexible, and fast platform for content providers and administrators to get a real-time view of the state of requests to their web servers.

Figure 1:
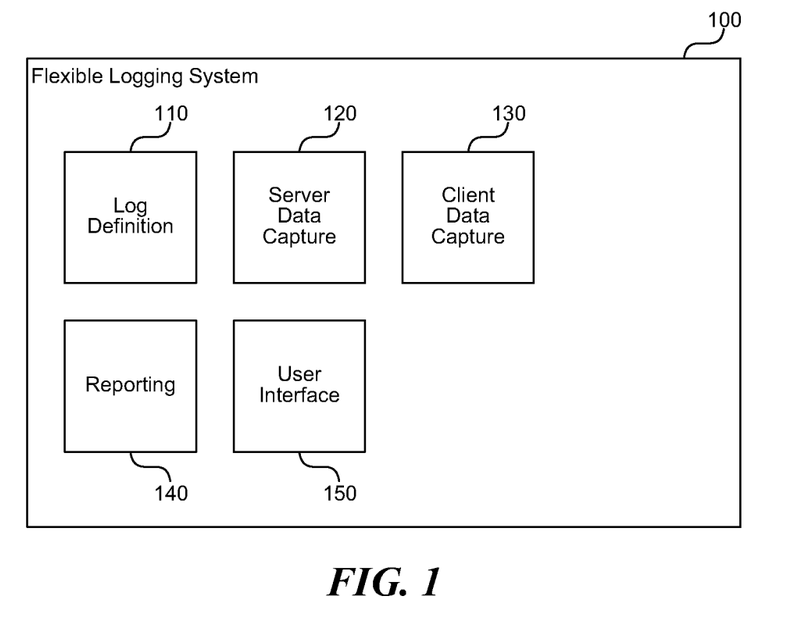
FIG. 1 is a block diagram that illustrates components of the flexible logging system, in one embodiment.

FIG. 1 is a block diagram that illustrates components of the flexible logging system, in one embodiment. The flexible logging system 100 includes a log definition component 110, a server data capture component 120, a client data capture component 130, a reporting component 140, and a user interface component 150. Each of these components is described in detail herein.

The log definition component 110 receives a log definition that describes one or more logs. The log definition includes a list of fields to include in the log. An administrator or content provider authors the log definition either by editing the log definition directly or through a user interface. For example, log definitions may be stored in a file, such as an extensible markup language (XML) file that can be edited with a text or other editor. Alternatively or additionally, the log definition component 110 may invoke the user interface component 150 to display, for example, a list of available log fields from which the user can select fields to include in the log. The log fields may include request headers, response headers, server variables, and module variables for modules that extend the functionality of the web server.

The server data capture component 120 captures events raised by the web server or by modules that extend the web server. The system 100 defines an event type that any code associated with the web browser can raise to supply logging data. The logging data may include a module identifier, field name, and detailed log information. A log definition can supply the module identifier and/or field name to identify particular fields that the log definition author wants to log. For non-module logging (e.g., request headers, response headers, and server variables), the event may provide a well-known identifier in place of the module identifier that distinguishes these types. The server data capture component 120 collects the entire raised event logging data and based on the log definition directs the data to one or more log destinations. One log destination may include a standard W3C log file, so that the web server continues to produce traditional web server logs alongside more advanced log reporting destinations.

The server data capture component 120 may aggregate and associate each event raised over the course of a particular request so that the system 100 can later correlate events from various modules and within the web server itself to provide a complete record of the processing of a request. For example, both server and client logs may contain a globally unique identifier (GUID) that is a field in logs related to the same event (e.g., request, media stream, and so on). In some cases, a request may span multiple servers. For example, when using adaptive streaming, a client may request portions of a media file from a farm of servers, and get some parts of the media file from different servers. The client may specify a client identifier that allows the system 100 to detect each of the client's requests regardless of the server that served the request, and then correlate the requests in the log data.

The log destinations may aggregate log data for a particular application, site, or virtual directory in its own directory of a data store, so that related log information is available in a location specific to the application without parsing a default server log file. The directory of the data store may also have particular permissions so that, for example, each application author running an application on a shared web host can only access log information related to the author's own application.

The client data capture component 130 captures events on the client and sends the events to the web server. Because the server provides requested web pages to the client, the server has some influence over what the client runs. Traditional analytics platforms embed JavaScript in a web page that requests a transparent image, where the request for the image includes data for the server in the URL. This method works well in some cases, but is limited by URL length and data type limits. The client side data capture component 130 can operate using this technique, however, the component 130 may use other techniques such as sending an application for the client to run and embedding a reference to the application in a requested web page, where the application provides logging data through HTTP POST requests that can contain much more data than URL based techniques.

One example of a client application that can be provided by the web server is a Microsoft Silverlight application. Microsoft Silverlight receives references in web pages to applications contained in containers called XAP files. Microsoft Silverlight extracts the XAP file and invokes the application. Microsoft Silverlight provides applications with a sandboxed, secure environment in which to run so that a user's computer system is protected from malicious or erroneous application code. Microsoft Silverlight provides APIs that applications can call to playback media and send data to the server in a way that shields the user's computer system and hardware from potentially harmful application actions. Thus, Microsoft Silverlight and other browser plug-ins can provide all of the functionality of an environment in which the client data capture component 130 expects to operate.

In some embodiments, the client data capture component 130 may include a component on the server that raises received client logging data as a logging event just as other logging events described herein raised on the server. This allows server-side reporting logic and log definitions to treat client-side logging data as one more source of fields to be included in a logging destination.

The reporting component 140 receives captured server and client data and provides the data to one or more reporting destinations. For example, the reporting component 140 may produce a standard W3C log file based on the captured events. When logging to a file, the reporting component 140 may hold log entries for a configurable period before writing the entries to disk, so that only the most recent log post within a certain window is written to disk—this minimizes repetitive interim data that gets written to disk for clients or requests that may be logging continually with cumulative data. The reporting component 140 may aggregate data received from multiple sources (e.g., the client, one or more server modules, operating system data, and so forth) into one or more log entries for reporting. For example, data related to a single client request may be logged together. The reporting component 140 may communicate with other systems to provide real-time log data. The reporting component 140 may write data directly to a database including one or more fields so that parsing is not used to read the data. Many analysis tools can be run directly against such a database.

The user interface component 150 provides an interface between the user and the components of the system 100. For example, the user interface component 150 may receive log definitions from the user and provide controls for editing log definitions. In addition, the user interface component 150 may receive administrative log commands, such as commands to start or stop logging, to rotate log files, and so forth. The user interface component 150 also displays information to the user, such as the details of a log definition, and potentially real-time reporting data.

The computing device on which the system is implemented may include a central processing unit, memory, input devices (e.g., keyboard and pointing devices), output devices (e.g., display devices), and storage devices (e.g., disk drives or other non-volatile storage media). The memory and storage devices are computer-readable storage media that may be encoded with computer-executable instructions (e.g., software) that implement or enable the system. In addition, the data structures and message structures may be stored or transmitted via a data transmission medium, such as a signal on a communication link. Various communication links may be used, such as the Internet, a local area network, a wide area network, a point-to-point dial-up connection, a cell phone network, and so on.

Embodiments of the system may be implemented in various operating environments that include personal computers, server computers, handheld or laptop devices, multiprocessor systems, microprocessor-based systems, programmable consumer electronics, digital cameras, network PCs, minicomputers, mainframe computers, distributed computing environments that include any of the above systems or devices, and so on. The computer systems may be cell phones, personal digital assistants, smart phones, personal computers, programmable consumer electronics, digital cameras, and so on.

The system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 2:
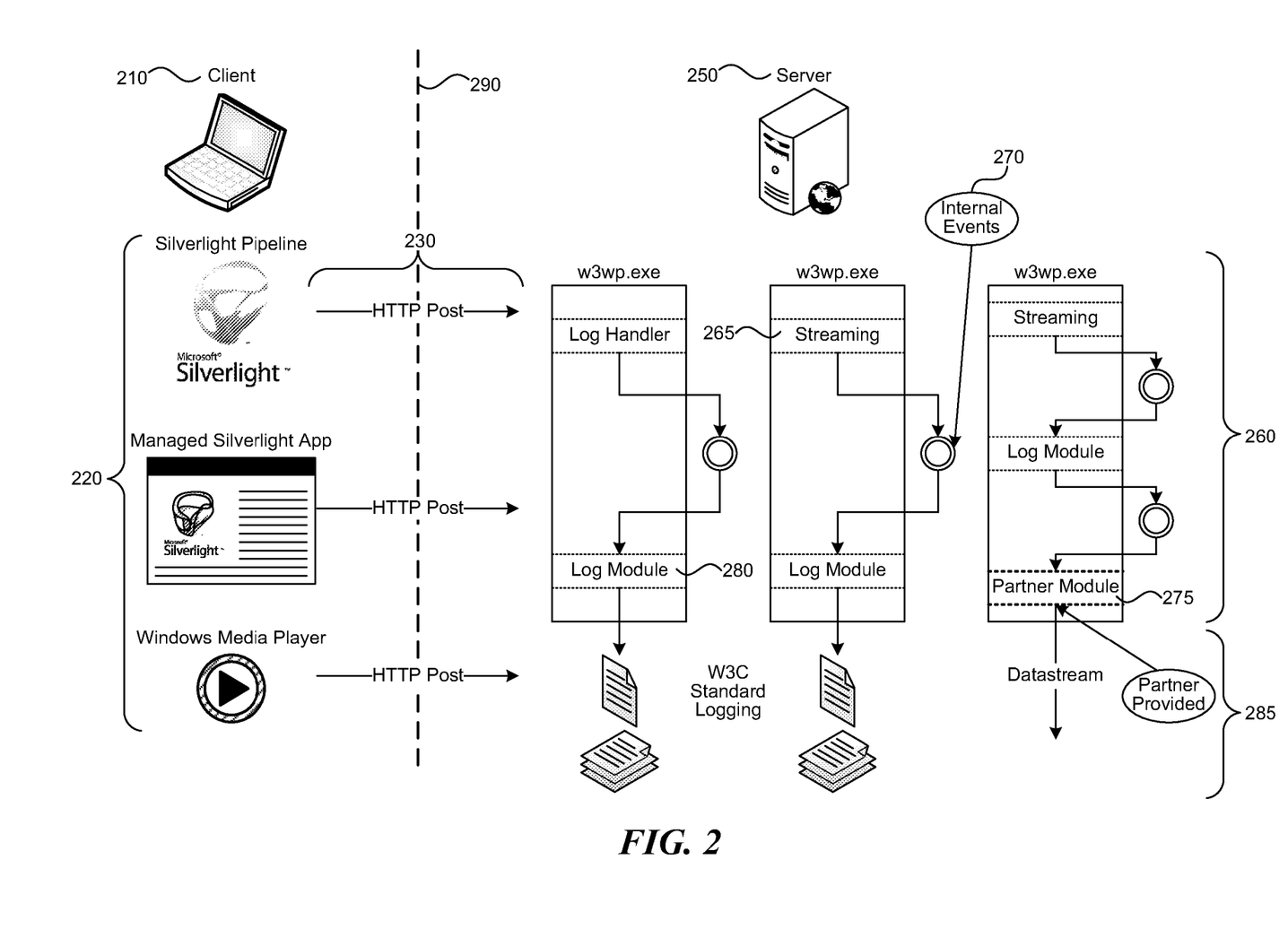
FIG. 2 is a block diagram that illustrates an operating environment of the flexible logging system, in one embodiment.

FIG. 2 is a block diagram that illustrates an operating environment of the flexible logging system, in one embodiment. The environment includes a client 210 and a server 250 connected through a network boundary 290. The client 210 includes one or more data sources 220 that provide log data, such as Microsoft Silverlight, browser applications, and media players. The client data sources 220 provide data to the server 250 across the network boundary 290, such as by using HTTP POST requests 230. The server 250 executes one or more web server processes 260. Each process includes various log sources 265 that raise events 270 when a potentially interesting event occurs. A log module 280 captures the events and reports them to one or more log destinations 285, such as a log file or partner database. Third parties may also provide modules, such as custom module 275 that capture raised log events and manipulate the received log data.

Figure 3:
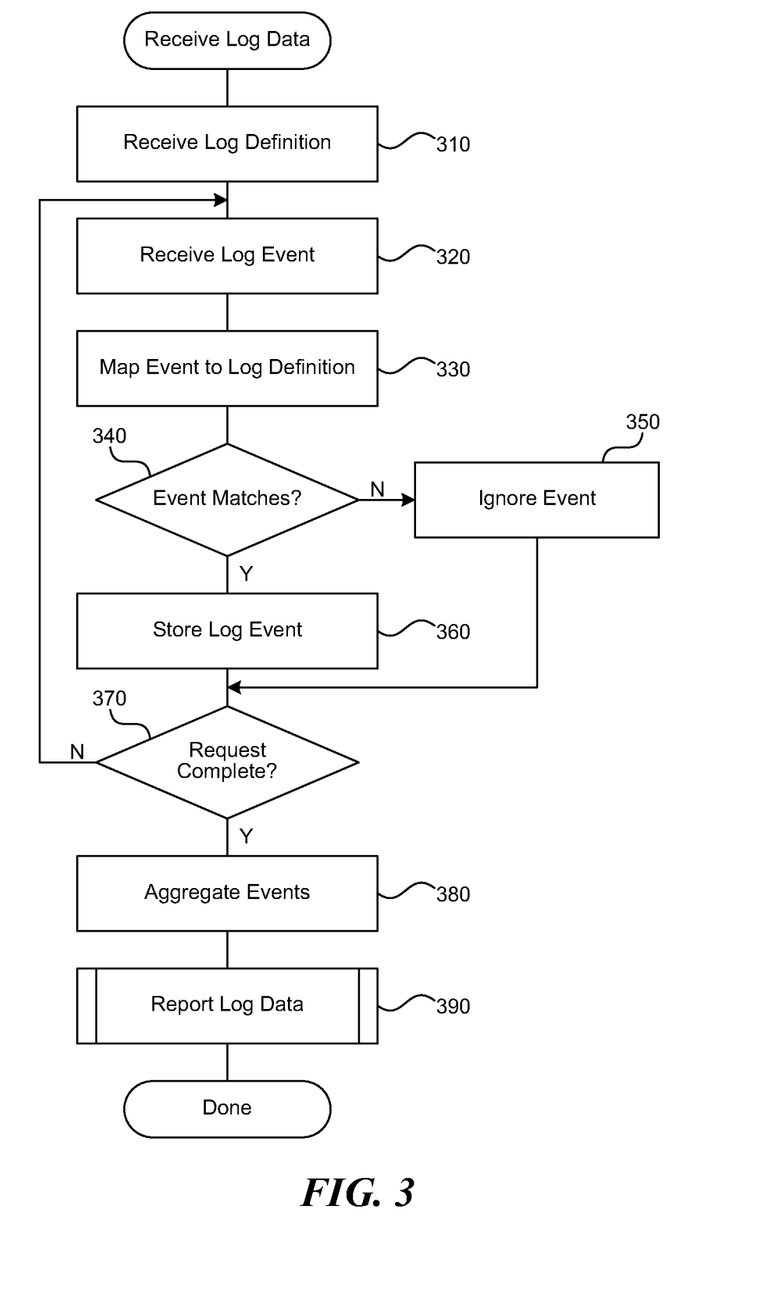
FIG. 3 is a flow diagram that illustrates the processing of the system to receive log data, in one embodiment.

FIG. 3 is a flow diagram that illustrates the processing of the system to receive log data, in one embodiment. Beginning in block 310, the system receives a log definition. The user may create the log definition through a user interface so that the system can access the log definition when log events are received. The log definition describes one or more logs and for each log the fields of interest to the user and one or more destinations to which to provide the log data. Continuing in block 320, the system receives log events. The system may receive log events from the server or the client at the same time. Server events may relate to processing of requests received by the server and client events may relate to user actions detected on the client (e.g., watching a video). Continuing in block 330, the system determines whether the received log event matches any log definition. For example, the event may contain a source identifier that matches a source identifier in the log definition or may contain one or more fields specified in the log definition. Note that the system performs the following steps for each matching log definition, and the same log events potentially contribute to more than one log.

Continuing in decision block 340, if the log event matches a log definition, then the system continues at block 360, else the system jumps to block 350. Continuing in block 350, the system ignores the log event and then continues to block 370. The system may raise many log events that are not of interest to the user and therefore are not contained in any log definition. The web server can be used to host many types of web sites, and each may have varied logging specifications. Continuing in block 360, the system stores the log event for reporting. For example, the system may store the log event in an in-memory list of log events. Continuing in decision block 370, if the system detects that a set of related log events are complete, then the system continues at block 380, else the system loops to block 320 to receive additional log events. For example, the system may detect all of the log events related to a single request and group them together for unified reporting.

Continuing in block 380, the system aggregates related log events for unified reporting. For example, a log definition may specify logging based on particular requests, applications, and virtual directories, and so forth, and the aggregation associates log events based on the log definition. Continuing in block 390, the system reports the stored log events data as described further with reference to FIG. 4. After block 390, these steps conclude.

Figure 4:
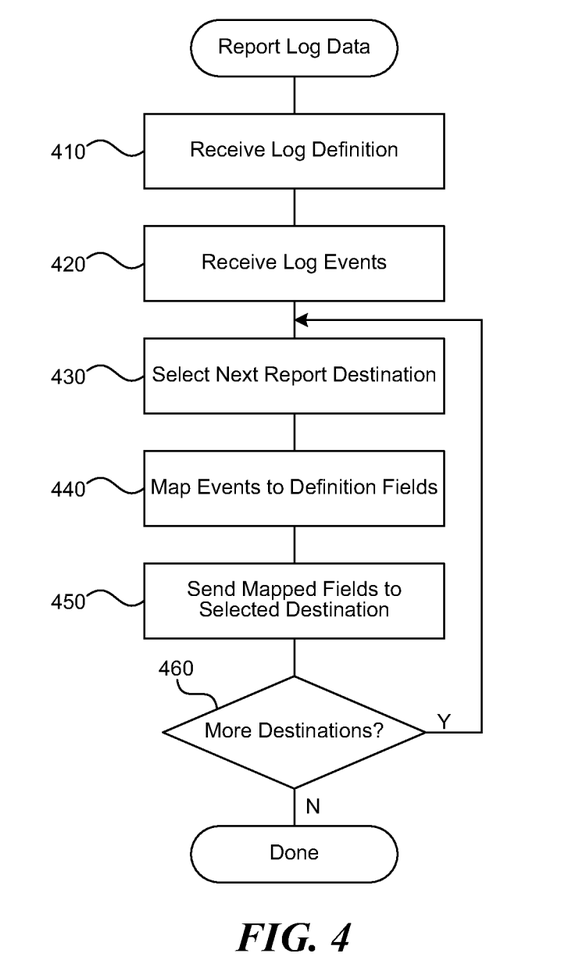
FIG. 4 is a flow diagram that illustrates the processing of the system to report received log data, in one embodiment.

FIG. 4 is a flow diagram that illustrates the processing of the system to report received log data, in one embodiment. Beginning in block 410, the system receives a log definition that specifies one or more log destinations to which to store log data. For example, the system may access the log definition in an XML file stored on each web server and the XML file may have hierarchical definitions for each destination. Continuing in block 420, the system receives one or more captured log events. For example, the system may receive the events following the process of FIG. 3. Continuing in block 430, the system selects the first (or next) report destination from the log definition. For example, the system may enumerate the report destinations and iterate through them.

Continuing in block 440, the system maps any fields in the log definition to the fields in the received log events. Fields can include many types of data, including request headers, response headers, server variables, and custom module data. The log events may include server and client side data corresponding to a particular event. Continuing in block 450, the system sends the mapped fields of the log data to the report destination. For example, if the report destination is a file, then the system stores the mapped fields of the log data to the file. If the report destination is a database, then the system may store the mapped fields as columns in a database table. Continuing in decision block 460, if there are more report destinations in the log definition, then the system loops to block 430 to select the next report destination, else these steps conclude. Although shown serially, the system may process multiple report destinations in parallel to reduce reporting latency and make efficient use of server resources.

In some embodiments, the flexible logging system provides real-time or near real-time (e.g., within five minutes) logging. For example, as the system receives log data from various server and/or client components, the system may report the data to an analysis server, such as a database associated with a reporting engine. An administrator or other user may view reports based on the data as the data arrives, so that the user has up to the minute information about the requests to the server. This information transfer occurs much faster than the traditional model of logging to file and then periodically post-processing the file. In addition, the system may separate the data based on particular data characteristics, such as logging requests for the same site, user, server, or virtual directory to the same location. The data may also be consumed by other (e.g., reporting) modules in the server pipeline and one or more modules can push the data to a database or web service for real time reporting and monitoring. Reporting log data first to the server to which the request originated overcomes restrictions imposed by some browsers against sending information to third party sites. In this case, the data goes first to the first party site, which then forwards the data to a third party site.

In some embodiments, the flexible logging system allows any HTTP client to send log information back to the server using standard HTTP POST/GET requests. The server takes care of distilling, validating, and logging the log information into consolidated logs or making it available for real-time reporting. For example, in media scenarios, the client could post back consumption related information regarding a playback session, which could be used for analytics, QOS monitoring, or billing. This could be used by standard authentication/authorization policies to provide secure logging. The log information being sent by the client is implementation dependent and the server implementation is flexible to accommodate custom fields.

The server may provide an application on the client (e.g., a Microsoft Silverlight-based browser application) with an extensible markup language (XML) or other format manifest that specifies the client logging requested to be sent to the server. Following is an example client manifest.

```
<?xml version="1.0" encoding="utf-8"?>
<SmoothStreamingLoggingManifest>
  <Destinations>
    <Destination logUrl="http://myServer/logs/IntermittentLogData.log"
        periodicPostInterval="30">
      <Fields baseSet="none">
        <Add name="Date" />
        <Add name="Time" />
        <Add name="c-playerId" />
        <Add name="audioBandwidth" />
        <Add name="videoBandwidth" />
        <Add name="audioBufferSize" />
        <Add name="videoBufferSize" />
      </Fields>
      <Events baseSet="all">
        <Remove name="EndOfStream" />
      </Events>
    </Destination>
    <Destination logUrl="http://myServer/logs/FinalLog.log"
        periodicPostInterval="0">
      <Fields baseSet="none">
        <Remove name="c-playerId" />
        <Remove name="c-bytes" />
      </Fields>
      <Events baseSet="none">
        <Add name="EndOfStream" />
      </Events>
    </Destination>
  </Destinations>
</SmoothStreamingLoggingManifest>
```

In this example, the manifest contains a "Fields" element that identifies the names of client-side fields to include in the log and a "Destination" element that identifies the URL to which the client is requested to send the logs (e.g., via HTTP POST). Note also that the example manifest includes two different log definitions that the client provides to different destination URLs and that contain different information. The author of the log definition can direct log data to the appropriate location and separate out useful information as it arrives, rather than performing wasteful post-processing. The flexible logging system can also operate both asynchronously and synchronously with regard to committing cached log data to permanent storage. This is useful for scenarios where in-memory cache is growing too fast and the system's archive process cannot keep up with incoming requests, as well as scenarios where immediate-write-through behavior is desired.

In some embodiments, the flexible logging system allows an administrator or content provider to specify custom fields in the log definition. This feature allows adding custom fields including (but not limited to) HTTP request headers, HTTP response headers, web server variables, and Windows performance counters. In addition, any web server module can log any field. These custom fields are then available for writing to log files or other report destinations. The system may also account for multiple setups, such as dedicated/shared hosting, so that information for multiple sites sharing the same server can be compartmentalized and provided to the sites' respective owners.

In some embodiments, the flexible logging system stores which fields are logged for a particular log file along with server configuration information. The configuration may also include policies, such as log roll over, log file name, whether client side logging is enabled, and so forth. The feature allows multiple log definitions to be created and thus allows logging information useful for that log. An example of scenario would be that a content delivery network that wants to log both quality of service (QoS) and analytics information. The analytics information is later shared with their customer while QoS is used in-house. In this case, the CDN does not have to perform post-processing, and can just create two log definitions and add only relevant fields to each.

In some embodiments, the flexible logging system receives filtering rules through the log definition component that limit the data logged according to a particular log definition. For example, a particular content provider may be interested in only logging requests for web pages (e.g., request includes *.htm) and not requests for images. The content provider can provide a filtering rule that specifies the filter to be applied for a particular log. In this way, the content provider can reduce the size of logs and ensure that the logs only contain the data in which the provider is interested. Other examples of filtering criteria include Multipurpose Internet Mail Extensions (MIME) type and required fields. Filtering allows the system to capture less data for faster processing, whether live or post-processing.

In some embodiments, the flexible logging system allows installation of custom modules for handling client logging. As described herein, the server may receive client logging data in a module that raises similar logging events to those raised by server side logging. Third parties may elect to replace this module with custom behavior in a custom module that performs processing specific to a particular web site or web application. The custom module allows the third party to include different handling for received client logging data than the default module behavior.

In some embodiments, the flexible logging system also allows installation of custom modules for handling reporting of captured log data. Although log definitions provide flexibility as to the log destination and types of information logged, some third parties may elect to provide additional custom handling of captured log data, and can do so through custom reporting modules. For example, a third party might implement a module that connects to a third party database and enters the captured log data in database rows according to a particular schema. Multiple custom reporting modules may operate at the same time to provide captured logging data in different ways for different purposes.

Currently, typical web servers only allow site-level logging. In some embodiments, the flexible logging system allows logging and isolating logs for various configuration levels, including site, application, virtual directory, and so on. For example, a shared hosting service may elect to provide a log for each virtual directory of a shared web host, so that each virtual directory owner can retrieve information about that owner's site. Today similar functionality involves splitting one web site log into multiple files as a post-processing step.

One scenario where the flexible logging system provides logging information unavailable in current logging systems is for progressive downloads, such as for live events. A progressive download may include audiovisual data for a long event (e.g., two hours). Traditional logging systems provide information about requests after the entire event is complete. In contrast, the flexible logging system can provide logging data as requests are received and ongoing throughout the event. An administrator sets up a log definition that specifies the types of events that the administrator wants to monitor and a destination for the monitored data. This can provide a content provider with early information about how many viewers are watching the event, any errors that are occurring, server load during the event, and so forth.

In some embodiments, the flexible logging system provides information for billing customers. For example, a particular customer may pay a content provider based on the number of times a content item is downloaded or based on the bandwidth that the customer uses in a period. The content provider may set up a log definition with usage information specific to billing, so that the content provider can correctly charge the customer.

Event Data Structures

The following is an example of event data structures raised by server-side modules that raise log events, in one embodiment.

```
struct HTTP_TRACE_EVENT{
    LPCGUID pProviderGuid;
    DWORD dwArea;
    LPCGUID pAreaGuid;
    DWORD dwEvent;
    LPCWSTR pszEventName;
    DWORD dwEventVersion;
    DWORD dwVerbosity;
    LPCGUID pActivityGuid;
    LPCGUID pRelatedActivityGuid;
    DWORD dwTimeStamp;
    DWORD dwFlags;
    DWORD cEventItems;
    __field_ecount(cEventItems)
    HTTP_TRACE_EVENT_ITEM * pEventItems;
};
```

| Member name | Description |
| --- | --- |
| pProviderGuid | An LPCGUID that contains the identifier of the provider. |
| dwArea | A DWORD that contains the area of interest for the event. The area value is be a positive integer. |
| pAreaGuid | An LPCGUID that indicates the area of interest. |
| dwEvent | A DWORD that contains the identifier of the event for the event provider. |
| pszEventName | An LPCWSTR that contains the name of the event. This value is set by the event provider to give a description of the event type. |
| dwEventVersion | A DWORD that contains the event version. Usually 0 or 1, but can contain any nonnegative integer value. |
| dwVerbosity | A DWORD that maps numerical values to their verbose counterparts (the values 0 through 5 map to General, FatalError, Error, Warning, Info, and Verbose respectively). |
| pActivityGuid | An LPCGUID that contains the request identifier. |
| pRelatedActivityGuid | An LPCGUID that contains a value for associating related activities. Most providers set this value to NULL and then allow the web server to populate the value before sending the event to event listeners. |

-continued

| | |
|---|---|
| dwTimeStamp | A DWORD that contains the optional time stamp, represented by an internal tick count. |
| dwFlags | A DWORD that contains additional flags. |
| cEventItems | A DWORD that contains the number of elements in the pEventItems array. |
| pEventItems | An array of HTTP_TRACE_EVENT_ITEM structures of length cEventItems. |

Following the HTTP_TRACE_EVENT structure are one or more of the following structures.

```
Struct HTTP_TRACE_EVENT_ITEM{
    LPCWSTR pszName;
    HTTP_TRACE_TYPE dwDataType;
    PBYTE pbData;
    DWORD cbData;
    LPCWSTR pszDataDescription;
};
```

| Member name | Description |
|---|---|
| pszName | An LPCWSTR that contains the name of the item, such as "RequestUrl." |
| dwDataType | An HTTP_TRACE_TYPE that contains the data type pointed to by pbData. |
| pbData | A PBYTE that contains the actual data that can be downcast (dependent on the value of dwDataType). |
| cbData | A DWORD that contains the number of bytes pointed to by pbData. |
| pszDataDescription | An LPCWSTR that contains an optional description of the data pointed to by pbData; otherwise, NULL. |

From the foregoing, it will be appreciated that specific embodiments of the flexible logging system have been described herein for purposes of illustration, but that various modifications may be made without deviating from the spirit and scope of the invention. For example, although web servers have been described herein, other server types that log information can use the techniques described herein to provide rich, flexible, and real-time logging. Accordingly, the invention is not limited except as by the appended claims.

We claim:

1. A computer-implemented method for reporting log data to one or more destinations, the method comprising:
   receiving, at an analysis engine, a log definition that specifies one or more report destinations to which to store log data and a format for storing the data at each destination and further specifies fields to be included in a log;
   receiving, at the analysis engine, one or more captured log events, the log events being related to requests and other events within a plurality of software components as each log event occurs in real-time, wherein the analysis engine is a unified software component running on a server that centrally receives the log events as direct notifications from the software components without waiting for the log events to be written to a log file or database and provides a real-time view of the state of the requests to an administrator;
   for each of the one or more report destinations, performing by the analysis engine the steps of:
      selecting the format for the report destination from the log definition;
      determining whether the received log events include information matching at least one of the fields included in the log definition; and
      upon determining that at least one of the log events includes information matching at least one of the fields in the log definition, reporting the information matching at least one of the fields to a report destination specified by the log definition.

2. The method of claim 1 wherein receiving captured log events comprises receiving at least one server-side event and at least one client-side event.

3. The method of claim 1 wherein the fields in the log definition are selected from the group consisting of one or more request headers, one or more response headers, one or more server variables, one or more performance counters, and one or more custom module fields.

4. The method of claim 1 wherein at least one report destination is a file and wherein reporting to the report destination comprises storing the mapped fields of the log events to the file.

5. The method of claim 1 wherein at least one report destination is a database and wherein reporting to the report destination comprises storing the mapped fields of the log events as columns in a database table.

6. The method of claim 1 wherein there exist multiple report destinations and wherein the steps for selecting, determining, and reporting to each report destination occur for at least two report destinations in parallel.

7. The method of claim 1 wherein reporting to the report destination comprises sending the log events to a database used to bill a customer based on the log events.

8. The method of claim 1 wherein receiving one or more captured log events comprises receiving information about a progressive download request before the request is complete, and wherein reporting to the report destination comprises providing the received information before the request completes.

9. The method of claim 1 wherein the log definition format for each report destination is customizable by an administrator to include fields selected by the administrator.

10. A computer system for providing flexible logging in connection with a web server, the system comprising:
   a processor and memory configured to execute software instructions;
   a log definition component configured to receive a log definition that describes one or more logs, wherein the log definition specifies a list of fields of data to include in the log and a destination to which to store the log;
   a server data capture component configured to capture events raised by the web server or by modules running within a web server process that extend the web server, the events arising from requests received by the web server, wherein the server data capture component determines which events to capture based on whether the events include first information matching at least one of the fields in the received log definition;
   a client data capture component configured to capture client events related to the requests on a client of the web server and send the client events to the web server, wherein the client data capture component determines which client events to capture based on whether the client events include second information matching at least one of the fields in the received log definition; and
   a reporting component configured to receive the first information and the second information and provide the first information and the second information directly to one or more reporting destinations as the first information and the second information arrives, wherein the reporting component receives the first information and the second information as direct notifications from the client and server software components without waiting for the the first information and the second information to be written to a log file or database and is further configured to provide a real-time view of the state of the requests to an administrator.

11. The system of claim 10 wherein the administrator or a content provider authors the log definition either by editing the log definition directly or through a user interface.

12. The system of claim 10 further comprising one or more web server extensions, wherein the list of fields associated with a log can be extended by extensions installed on the web server based on log data that an installed extension provides.

13. The system of claim 10 wherein the system defines an event type that any software module associated with the web browser can raise to supply log data and wherein the log data includes a module identifier, a field name, and log information.

14. The system of claim 10 wherein the server data capture component is further configured to collect any raised event log data and based on the log definition direct the data to one or more log destinations.

15. The system of claim 10 wherein the server data capture component is further configured to aggregate and associate each event raised over the course of a particular request, and wherein the system subsequently correlates events from various modules and within the web server itself to provide a complete record of the processing of a request.

16. The system of claim 10 wherein the client data capture component is further configured to provide log data to a third-party customizable server module that performs custom client data handling.

17. The system of claim 10 wherein the reporting component is further configured to correlate captured server and client data that relates to the same request based on a matching request identifier stored in the server data and the client data.

18. A computer-readable storage device comprising instructions for controlling a computer system to capture log data within a web server, wherein the instructions, when executed, cause a processor to perform actions comprising:
receiving a log definition, wherein the log definition specifies fields selected by an author of the log definition to be included in a log and one or more destinations to which to provide log data;
receiving log events arising from requests involving a plurality of software components that raise the log events as actions occur within each software component, wherein the log events include log events from the web server and at least one client of the web server, wherein the system receives the log events as direct notifications from the software components without waiting for the log events to be written to a log file or database and is capable of providing a real-time view of the state of the requests to an administrator;
determining whether the received log events include information matching at least one of the fields in the log definition; and
upon determining that at least one of the log events includes information matching at least one of the fields in the log definition, reporting the information matching at least one of the fields to a report destination specified by the log definition.

19. The device of claim 18 wherein each log event contains an identifier based on a type of the event and wherein determining whether the received log events include information comprises comparing at least one identifier in the log definition with at least one identifier in the received log events.

20. The device of claim 18 wherein determining whether the received log events include information comprises matching a particular log event to more than one log in the log definition.

* * * * *